United States Patent

Holley et al.

Patent Number: 5,902,243
Date of Patent: May 11, 1999

[54] ULTRASONIC IMAGING METHOD WITH MULTIPLE PULSE CANCELLATION

[75] Inventors: Gregory L. Holley, Mountain View; David J. Hedberg; David J. Napolitano, both of Menlo Park, all of Calif.

[73] Assignee: Acuson Corporation, Mountain View, Calif.

[21] Appl. No.: 09/061,083

[22] Filed: Apr. 15, 1998

[51] Int. Cl.$^6$ ....................................................... A61B 8/00
[52] U.S. Cl. ............................................ 600/443; 600/447
[58] Field of Search .................................. 600/443, 444, 600/447, 458

[56] References Cited

U.S. PATENT DOCUMENTS

| | | | |
|---|---|---|---|
| 5,010,885 | 4/1991 | Fink et al. | 600/443 |
| 5,415,171 | 5/1995 | Goh et al. | 600/443 |
| 5,419,328 | 5/1995 | Goh et al. | 600/443 |
| 5,632,277 | 5/1997 | Chapman . | |
| 5,706,819 | 1/1998 | Hwang . | |

FOREIGN PATENT DOCUMENTS 0 770 352A1  5/1997  European Pat. Off. .......... A61B 8/00

*Primary Examiner*—Marvin M. Lateef
*Assistant Examiner*—Ali M. Imam
*Attorney, Agent, or Firm*—Brinks Hofer Gilson & Lione

[57] ABSTRACT

An ultrasound imaging method includes the step of transmitting two ultrasonic transmit pulses into a region. First components of the transmit pulses are inverted with respect to each other while second components of the transmit pulses are not. Received ultrasound pulses associated with the transmit pulses are summed to selectively cancel the harmonic or fundamental components. By properly selecting the inverted and noninverted portions of the transmit pulses, the transmit pulses may be made unipolar, or they may be pre-distorted to further reduce second harmonic energy associated with system or tissue non-linearities.

10 Claims, 9 Drawing Sheets

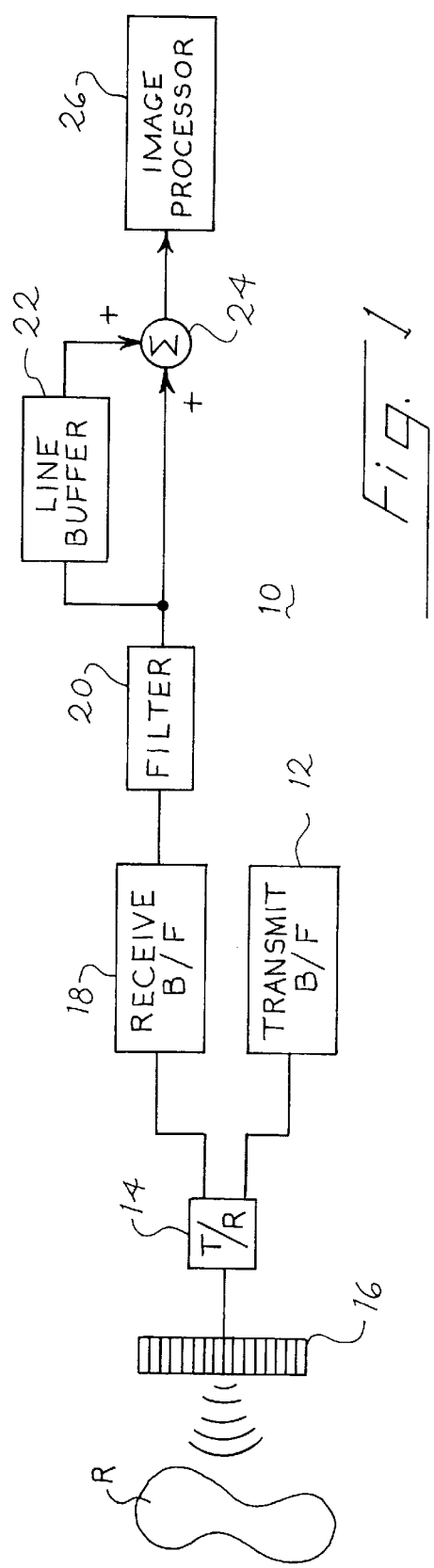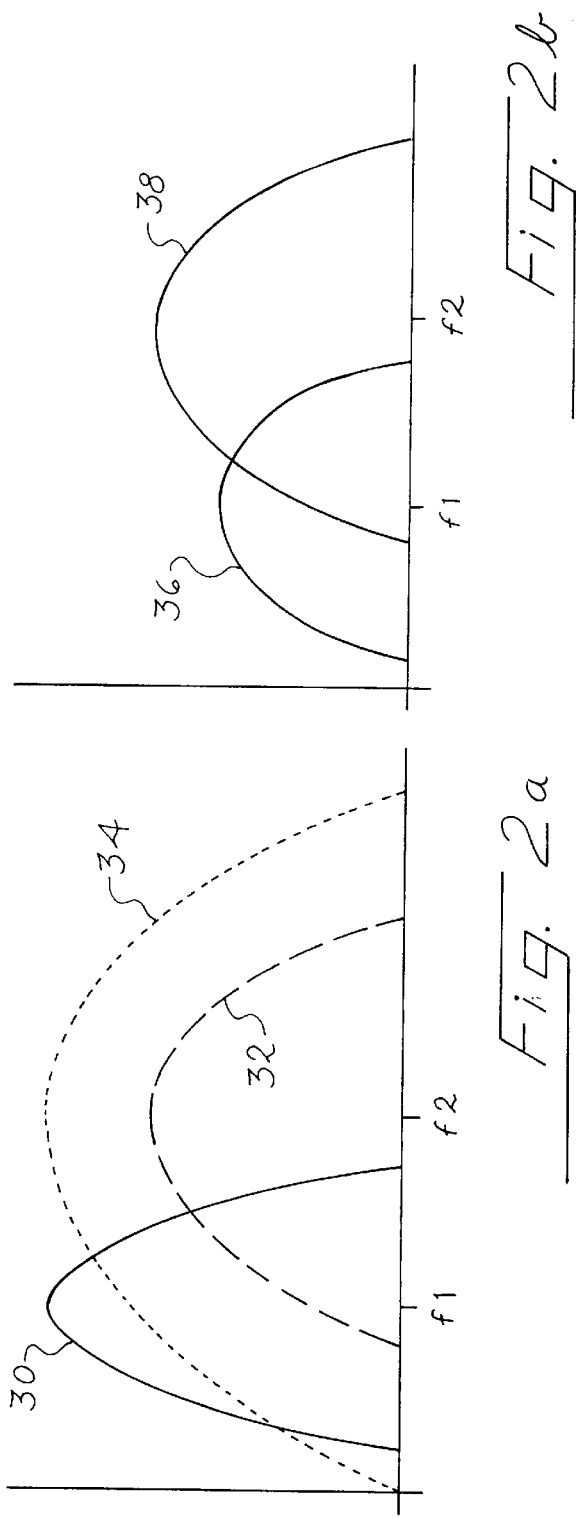

ULTRASONIC IMAGING METHOD WITH MULTIPLE PULSE CANCELLATION

BACKGROUND

This invention relates to ultrasonic imaging methods such as diagnostic medical ultrasonic imaging methods, and in particular to improved transmit signal generators for such methods.

Hwang U.S. Pat. No. 5,706,819 and Chapman U.S. Pat. No. 5,632,277 disclose additive inverse techniques for selectively removing fundamental components of an ultrasonic image. In the disclosed methods, two or more ultrasonic pulses are transmitted into a subject along the same beam direction, including first and second pulses of opposite polarity. The echo signals associated with the first and second pulses are summed, thereby causing linear components to cancel to a greater extent than non-linear components. For example, fundamental frequency components of the echo signal associated with linear propagation and scattering are selectively canceled, and second harmonic components of the echo signal due to non-linearities are enhanced.

The present invention is directed to improvements to such additive inverse processing methods.

SUMMARY

The present invention is defined by the following claims, and nothing in this section should be taken as a limitation on those claims.

By way of introduction, the preferred embodiments described below provide improved transmit pulses for use in an additive inverse imaging system. These transmit pulses include a first component that is inverted between two transmit pulses, and at least one second component that is not. By choosing the non-inverted component appropriately, unipolar transmit pulses are possible. By providing a harmonic component, the transmit pulses can be pre-distorted to reduce undesirable harmonic components of the receive signals associated with system and tissue non-linearities.

BRIEF DESCRIPTION OF THE DRAWINGS

FIG. 1 is a block diagram of an ultrasonic imaging system suitable for use with this invention.

FIGS. 2a and 2b are frequency-amplitude diagrams illustrating operation of the system of FIG. 1.

DETAILED DESCRIPTION OF THE PRESENTLY PREFERRED EMBODIMENTS

Figure 3A:
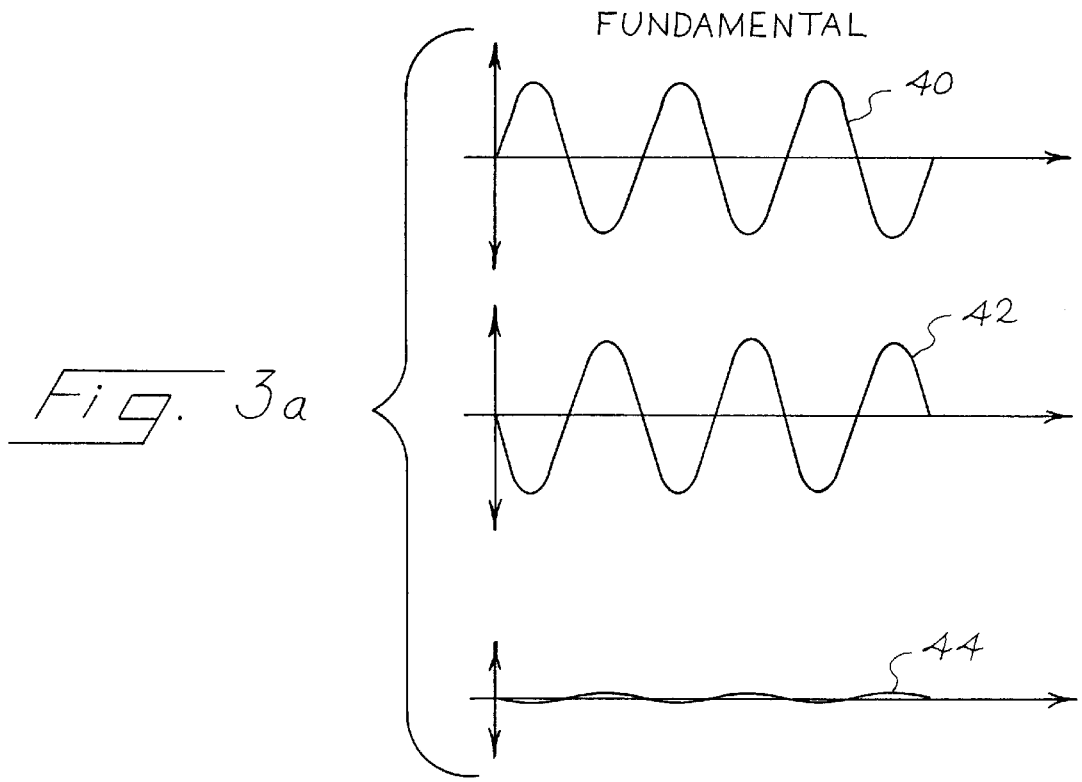
FIGS. 3a and 3b are waveform diagrams illustrating operation of the system of FIG. 1.

Turning now to the drawings, FIG. 1 shows an ultrasonic imaging system 10 suitable for use with this invention. The system 10 includes a conventional ultrasound transmit beamformer 12. The transmit beamformer 12 supplies transmit pulses that are applied via a transmit/receive switch 14 to a multi-element transducer array 16. The transducer array 16 transmits ultrasound pulses into a region R of an imaging subject.

The reflected ultrasound pulses from the region R are received by the transducer array 16 and applied to a conventional ultrasound receive beamformer 18 via the transmit/receive switch 14. The receive beamformer 18 supplies as an output an analytic (pre-detection) signal, preferably via a filter 20, to a line buffer 22 that is coupled to a summer 24. The filter 20 is not required in all embodiments, but in this embodiment is provided to remove most of the fundamental component of the receive signal. By means of the line buffer 22 and the summer 24, two successive ultrasound lines are added together or subtracted. The output of the summer 24 is sent to an image processor 26 for further processing, such as signal detection and display to the user.

The various components of the system 10 can take any suitable form. For example, the beamformers 12, 18 can be either analog or digital beamformers. In general, the widest variety of alternatives can be used, including those described in U.S. patent application Ser. No. 09/061,082.

The system 10 in this embodiment is operated in a two pass pattern. First, an ultrasound transmit pulse is directed into the region R along a first beam direction at a known reference phase. FIG. 2a illustrates the spectrum of the reflected ultrasonic pulse as output by the receive beamformer 18. This spectrum includes two components: a fundamental component 30 at or about the fundamental transmitted frequency f1 (arising from linear scattering and propagation), and a harmonic component 32 at or about frequency f2 (approximately twice f1), arising from second harmonic non-linear scattering or propagation. The response of the filter 20 is shown at 34 in FIG. 2a. This response is preferably centered about the harmonic frequency, and is used to reduce fundamental signal components. The frequency spectrum of the output of the filter 20 is shown in FIG. 2b. Here, the level of the fundamental component 36 has been reduced as compared to the level of the harmonic component 38.

The filter 20 may be omitted entirely with acceptable results. The multiple pulse approach described in this specification allows broader band transmit pulses and receive filters to be used than could be used in a conventional harmonic imaging system, resulting in greater overall imaging bandwidth and hence improved axial resolution.

The output of the filter 20 is stored in the line buffer 22 on the first pass. On the second pass, the same ultrasound line is fired, but with a phase shift of pi radians or 180 degrees with respect to the first pulse. The second pass ultrasound data is then added to the first pass ultrasound data stored in the line buffer 22.

Components of the received ultrasound data arising due to linear propagation and scattering are inverted in polarity as a result of the polarity inversion of the transmit pulses. Thus, any linear components in the received ultrasound data cancel after summing. This is illustrated in FIG. 3a, where the fundamental components 40, 42 of the first and second transmit pulses have a sum 44 that is low in amplitude.

Figure 3B:
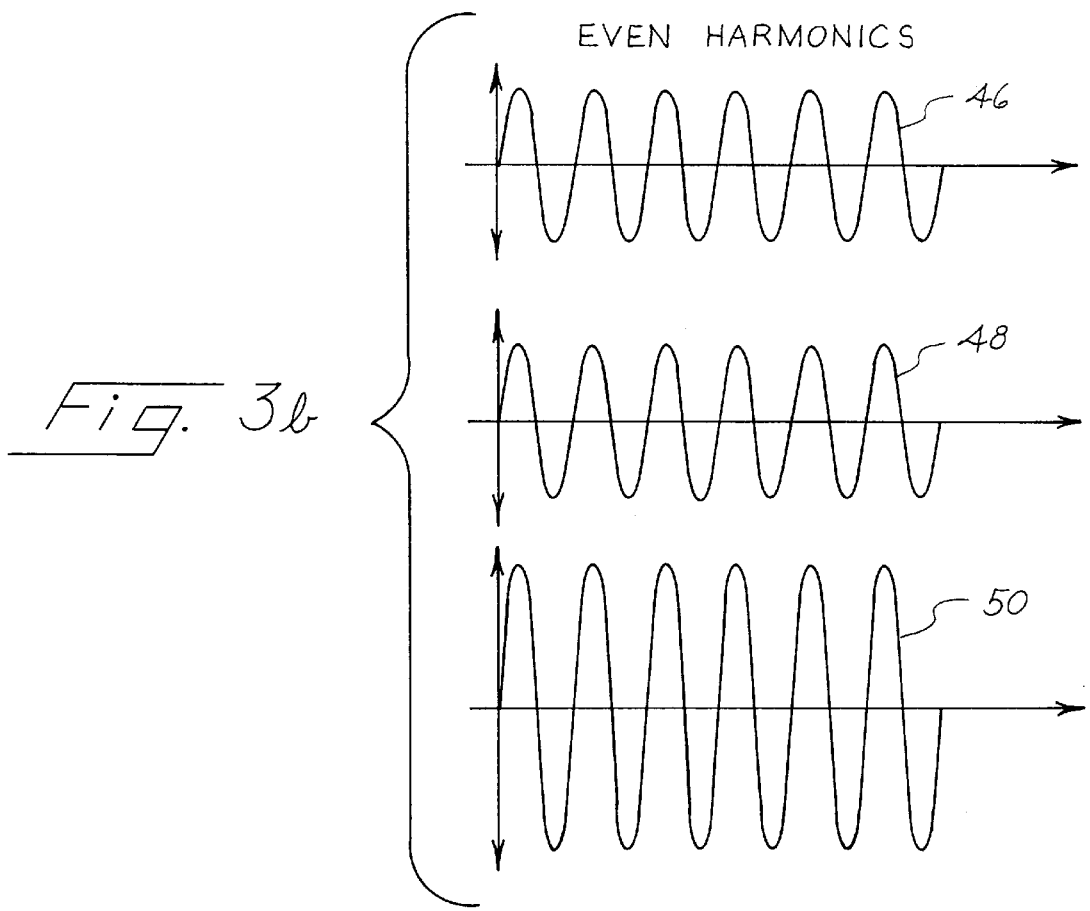

A different result is obtained for components of the received ultrasound data arising as even harmonics from non-linear scattering or propagation. These components will have the same phase in both the first pass received ultrasound data and the second pass received ultrasound data and will thus survive the summing operation by constructive interference. This is illustrated in FIG. 3b, where the harmonic components 46, 48 of the first and second transmit pulses create a sum 50 with a relatively large amplitude.

In general, shifting the phase of the transmit pulses by phi shifts the phase of any first harmonic (fundamental) components of the received ultrasound data by the same phase shift phi, but shifts the phase of any second harmonic components of the received ultrasonic data by 2*phi. Any third harmonic components experience a 3*phi phase shift, and so on. Thus, if a phase shift of pi radians is applied between the two transmit pulses as described above, all even harmonic components of the received ultrasound data will experience a phase shift of 2*pi*n radians and will be reinforced by summing, while all odd harmonic components will experience a phase shift of 2*pi*n+pi radians, and will be canceled by the summing operation.

Alternately, the second pass ultrasonic data can be subtracted instead of added from the first pass ultrasonic data. With this approach even harmonic components are canceled and odd harmonic components including the fundamental component are reinforced by the summing operation.

The two pulse summing approach described above provides greater rejection of either the fundamental or the even harmonic components than can be obtained by conventional beamformer using conventional filters. In particular, the two pulse approach can separate the echo signal from non-linear scatterers (even harmonic generators) at one frequency from the echo signal from linear scatterers at the same frequency. This is particularly useful when the transmit pulse contains significant energy in the harmonic band.

Instead of transmitting a pure modulated sinusoid, alternate transmit waveforms may be used instead of transmitting two waveforms differing by a pi radian phase shift as described above, one can transmit waveforms Y(t) and −Y(t). This is equivalent to a pi radian phase shift for all of the frequency components comprising the pulse. In an alternate method of construction, a gated or modulated square wave may be used in place of the gated or modulated sinusoid.

Figure 4:
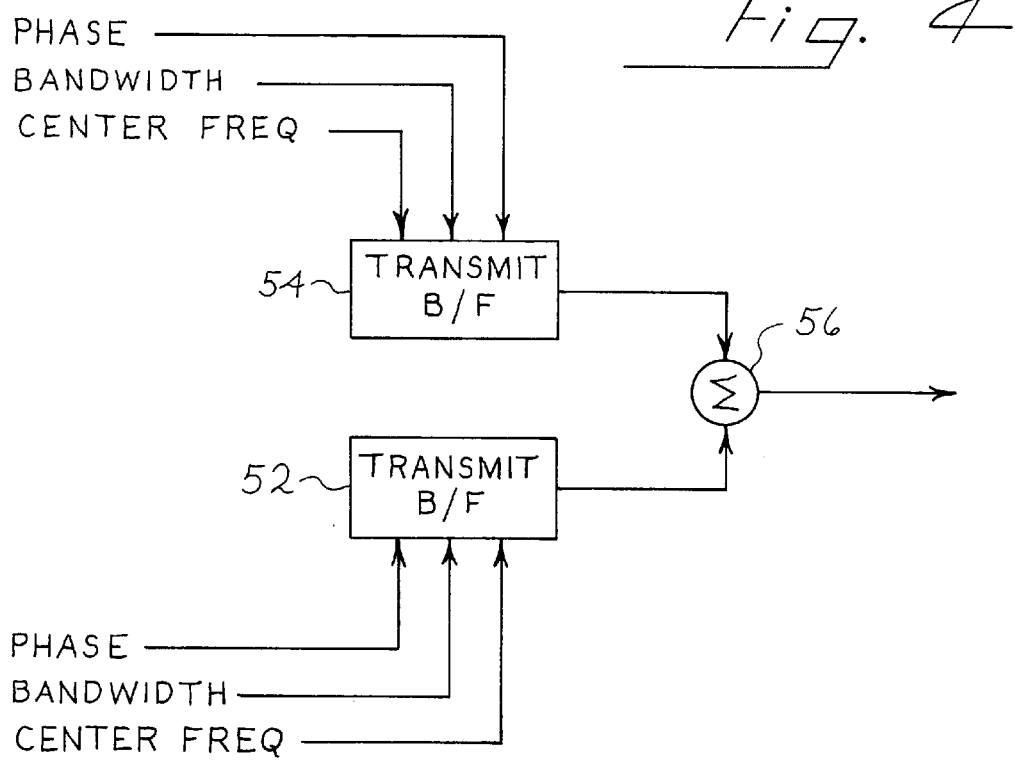
FIG. 4 is a block diagram of an alternative transmit beamformer for implementing the present invention.

In general, the transmitted ultrasound pulses may comprise components X(t) and Y(t), summed together. For example, a transmit beamformer as shown in FIG. 4 can be used. This transmit beamformer is capable of forming a transmit pulse containing two spectral components. The first is generated by the transmit beamformer 52 and the second spectrum component is generated by the transmit beamformer 54. These two spectral components are summed by the summer 56 before they are applied to the transducer array.

In general, if the two transmitted pulses take the form X(t)+Y(t) and X(t)−Y(t), then the summed receive signal from the summer 24 of FIG. 1 includes three components:

1. ultrasound signals resulting from the linear scattering of X(t),
2. ultrasound signals resulting from even harmonic non-linear scattering of X(t), and
3. ultrasound signals resulting from even harmonic non-linear scattering of Y(t).

Ultrasound signals resulting from linear scattering of Y(t) are canceled in the summing operation.

In one embodiment, transmit pulses are viewed as the sum of an unmodulated baseband component and a modulated bandpass component which has the desired spectral properties and phase for imaging and fundamental cancellation.

For example, unipolar transmit pulses may be formed by combining an unmodulated signal x(t) with a modulated signal y(t) as follows:

$$p1(t)=x(t)+y(t),$$

$$p2(t)=x(t)-y(t),$$

where $x(t) \geq |y(t)|$, so that $x(t)+y(t) \geq 0$ and $x(t)-y(t) \geq 0$. For example, if y(t) is represented as $$y(t)=e(t)*\cos(2pi*f*t)$$

and x(t) is selected to be e(t), the above conditions for unipolar pulses are satisfied.

Both pulses contain a strong fundamental spectral component but with opposite (180 degree) fundamental carrier phase. The transmitted pulses will stimulate second harmonic generation with second harmonics of the same phase, since the second harmonic carrier phase rotates at twice the rate of the fundamental, or 360 degrees.

Thus, when the return echo signals from sequential pulse firings are added, the components due to x(t) add to form a 2x(t) echo, and the components due to the fundamental carrier cancel since they are out-of-phase. The second harmonic echo components are in-phase, so they are enhanced by a factor of two after addition. The later is the desired echo signal in harmonic imaging.

The echo from the baseband component 2x(t) is generally an unwanted component, but it can be made very small by choosing the shape of x(t) such that its spectral energy in the second harmonic region is insignificant.

In a second embodiment, transmit pulses can be formed with "pre-distortion" terms in the following manner:

$$p1(t)=a1(t)*\cos(4pi*f*t+phi1(t))+e(t)*\cos(2pi*f*t);$$

$$p2(t)=a2(t)*\cos(4pi*f*t+phi2(t))-e(t)*\cos(2pi*f*t).$$

The second harmonic components at 2xf can be designed to cancel non-linear distortion produced in the generation of the acoustic pulse (e.g. due to transmitter circuit or non-linear transducer effects) or can be set to cancel tissue harmonic distortion generated at a given range for the purpose of enhancing contrast with non-linear scattering agents.

The two pre-distortion envelopes a1(t) and a2(t) and the two phases phi1(t) and phi2(t) will in general be similar, but may differ slightly due to the need to cancel particular non-linear distortion generating mechanisms. The envelopes a1(t) and a2(t) will typically be much smaller (e.g. factor of ten or smaller) than the fundamental envelope e(t).

Techniques and uses involving pre-distortion are the subject of associated U.S. patent applications Ser. No. 08/911,973 and Ser. No. 09/061,014, which are hereby incorporated by reference.

Features of the above two embodiments described above can be combined in a third embodiment where unipolar transmit pulses are constructed in the following manner:

$$p1(t)=x(t)+a1(t)*\cos(4pi*f*t+phi1(t))+e(t)*\cos(2pi*f*t);$$

$$p2(t)=x(t)+a2(t)*\cos(4pi*f*t+phi2(t))-e(t)*\cos(2pi*f*t).$$

These transmit pulses have the form $$p1(t)=x(t)+y1(t),$$

$$p2(t)=x(t)+y2(t),$$

where the functions y1(t) and y2(t) are the pre-distorted modulated pules defined in the second embodiment above. Note that except for the small pre-distortion terms, this form is very similar to that of the introductory discussion:

$$p1(t)=X1(t)+Y(t),$$

$$p2(t)=X2(t)-Y(t),$$

where $$X1(t)=x(t)+a1(t)*\cos(4pi*f*t+phi1(t))$$

$$X2(t)=x(t)+a2(t)*\cos(4pi*f*t+phi2(t))$$

$$Y(t)=e(t)*\cos(2pi*f*t).$$

Since a1(t) and a2(t) are much smaller than e(t), we have $$X1(t)\sim=X2(t).$$

Figure 5:
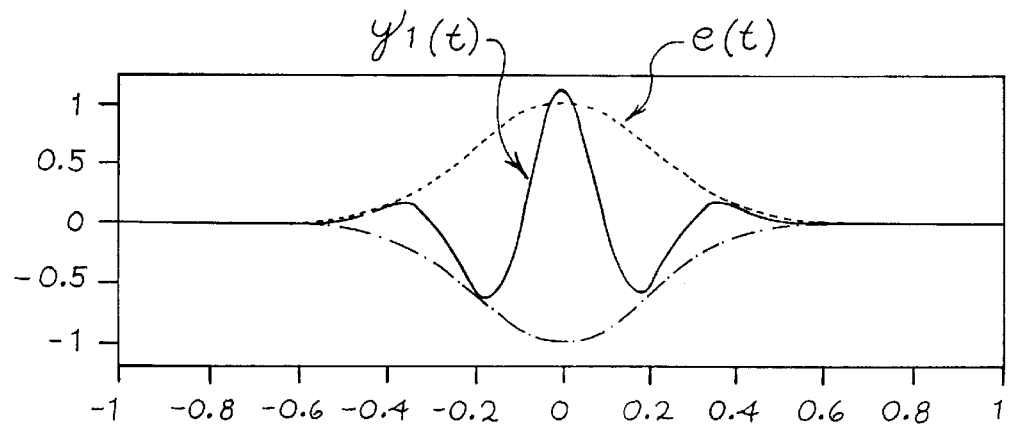
FIGS. 5 and 6 are waveform diagrams of fundamental components of two transmit pulses.
Figure 6:
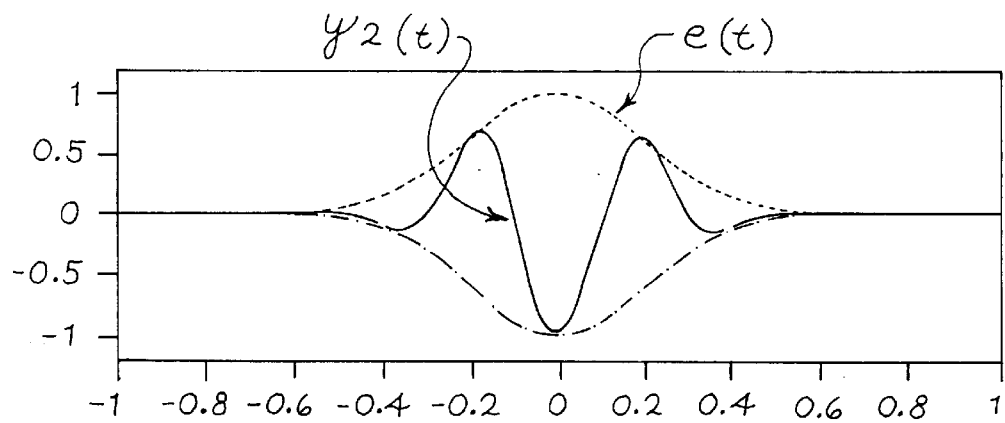
Figure 7:
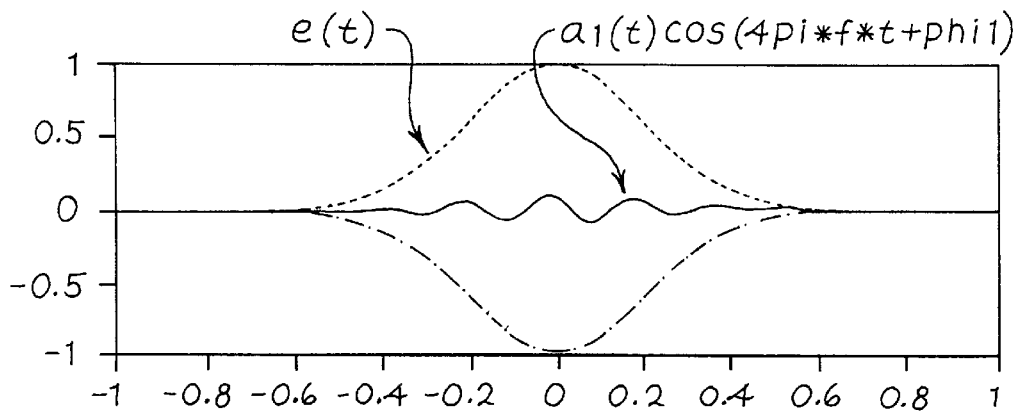
FIGS. 7 and 8 are waveform diagrams of harmonic components of two transmit pulses.
Figure 8:
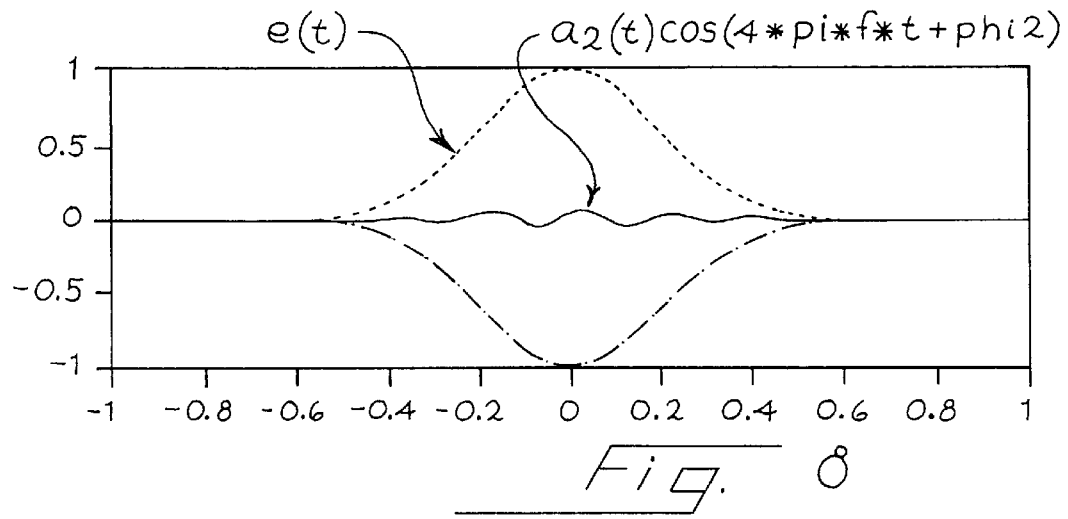

Illustrations of the modulated bandpass components y1 and y2 are given in FIGS. 5 and 6. The second harmonic terms are shown separately in FIGS. 7 and 8.

In order to produce a unipolar modulated waveform, an unmodulated unipolar function x(t) is added such that $x(t)+y1(t) \geq 0$ and $x(t)+y2(t) \geq 0$.

The transmit pulses p1(t) and p2(t) will be unipolar if $x(t) \geq |y(t)|$ and $x(t) \geq |y2(t)|$.

In one preferred embodiment, x(t) is chosen to be of the form $x(t)=\underline{x}(t)+e(t)$, where $\underline{x}(t)$ is a suitable baseband offset signal. The offset signal $\underline{x}(t)$ may be chosen to vanish to zero outside an interval containing the active region of the pulse, thus providing a suitable amount of offset bias in order to keep a unipolar transmitter circuit biased in its linear low-distortion region during the active transmit pulse. The envelope and offset function will usually be chosen so that the spectrum of the baseband function x(1) will be very low (insignificant) in the desired second harmonic receive band. The offset function and transmit pulse are preferably zero outside of an interval containing the active pulse in order to shut off the transmitter for maximum power efficiency.

Figure 9:
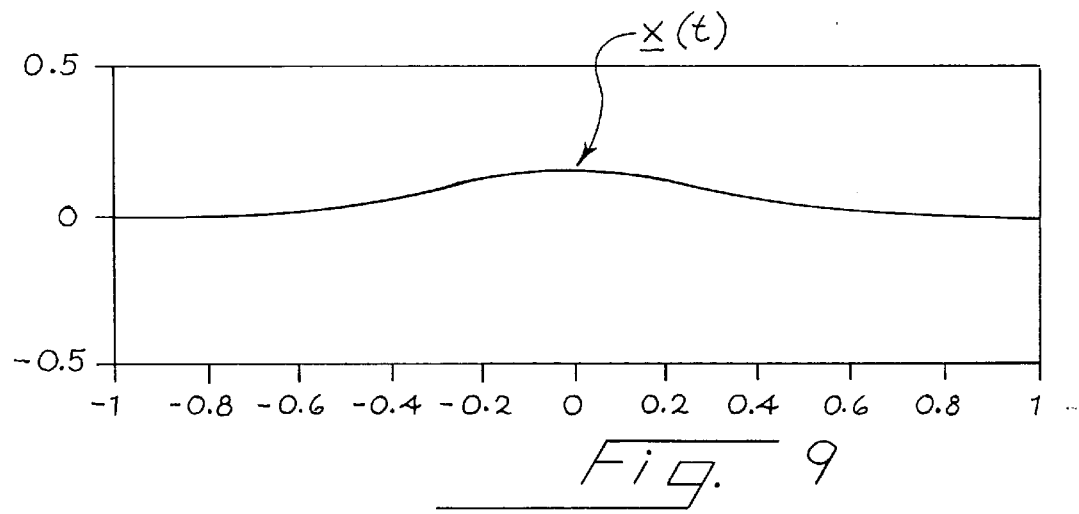
FIG. 9 is a waveform diagram of a baseband component of a transmit pulse.
Figure 10:
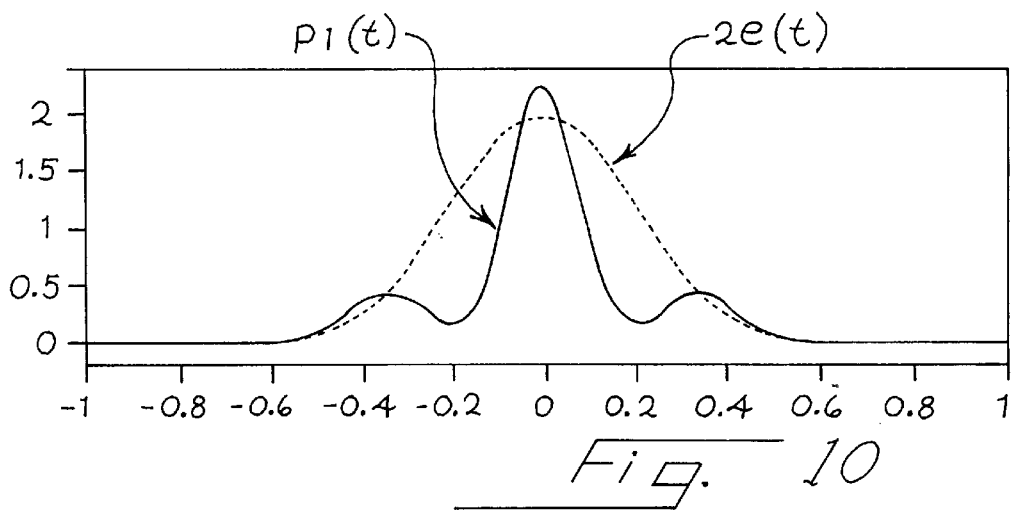
FIGS. 10 and 11 are waveform diagrams of two unipolar transmit pulses.
Figure 11:
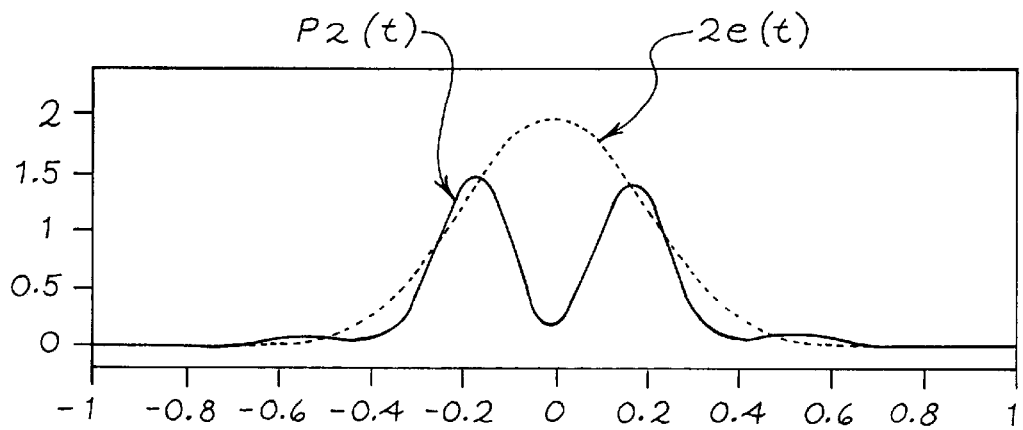

Since a1(t) and a2(t) are relatively small, this condition can be ensured if for example we choose $\underline{x}(t) \geq 2*\max(|a1(t)|, |a2(t)|)$. Usually, $\underline{x}(t)$ will be a Gaussian-like window function similar to e(t). However, the shape and spectral contribution of $\underline{x}(t)$ is not quite as critical, since it will typically be much smaller than e(t). An illustration of $\underline{x}(t)$ is given in FIG. 9. Illustrations of typical resulting unipolar pulses p1(t)=x(t)+y1(t) and p2(t)=x(t)-y2(t) are given in FIGS. 10 and 11.

Figure 12:
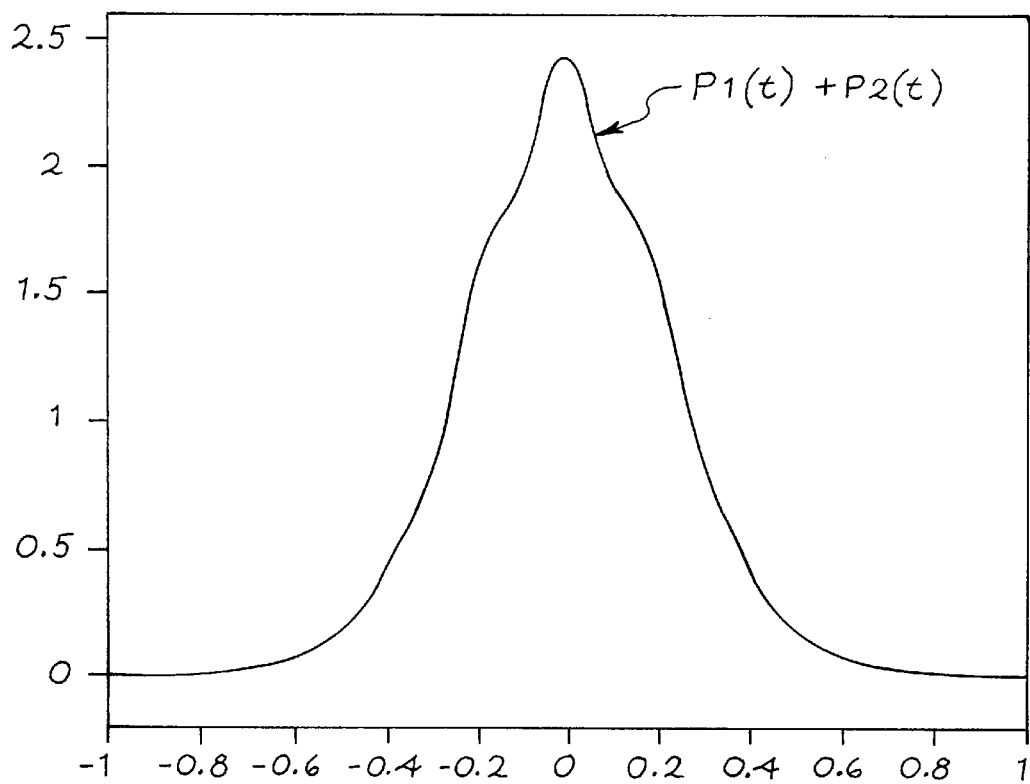
FIG. 12 is a waveform diagram of a combined receive signal.

The sum of p1 and p2 is illustrated in FIG. 12 and is approximately equal to 2*x(t) except for the small residual signals containing the second harmonic pre-distortion terms which do not sum to zero.

Figure 13:
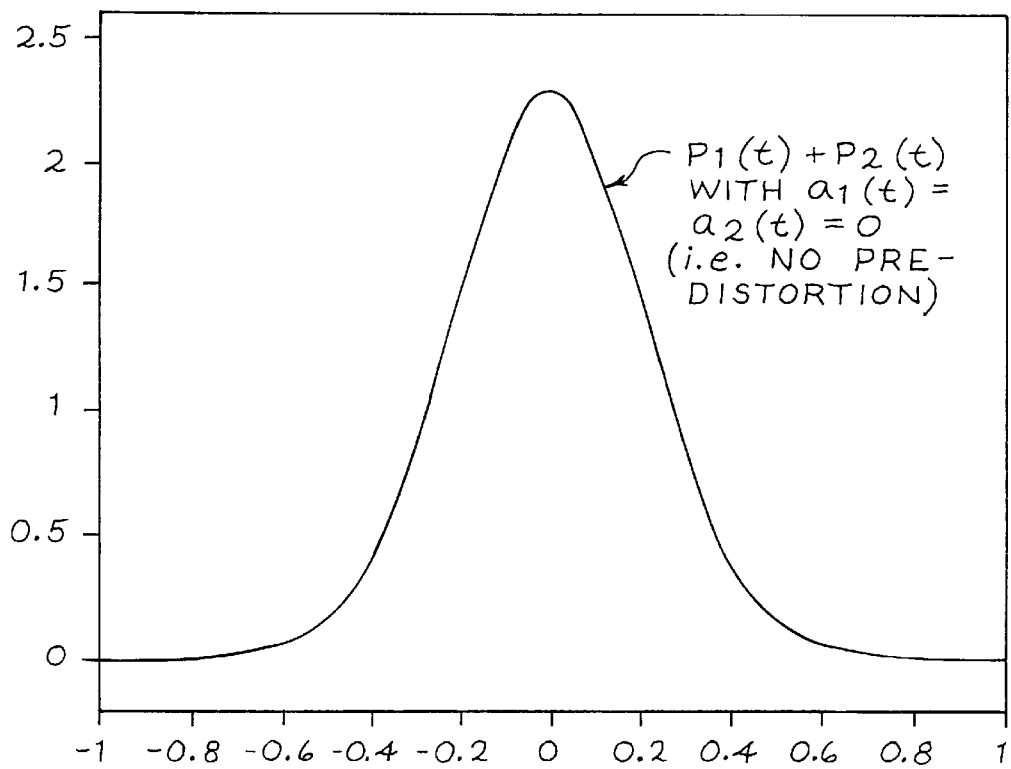
FIG. 13 is a waveform diagram of another combined receive signal.

FIG. 13 shows the sum of p1 and p2 for the special case a1(t)=a2(t)=0, where there are no pre-distortion terms.

Figure 14:
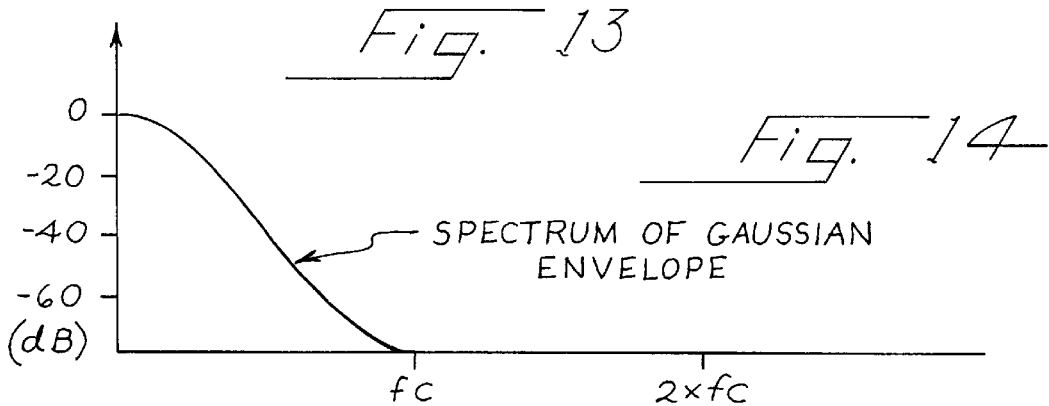
FIGS. 14 and 15 are frequency-amplitude diagrams of a Gaussian envelopes and a unipolar pulse, respectively.
Figure 15:
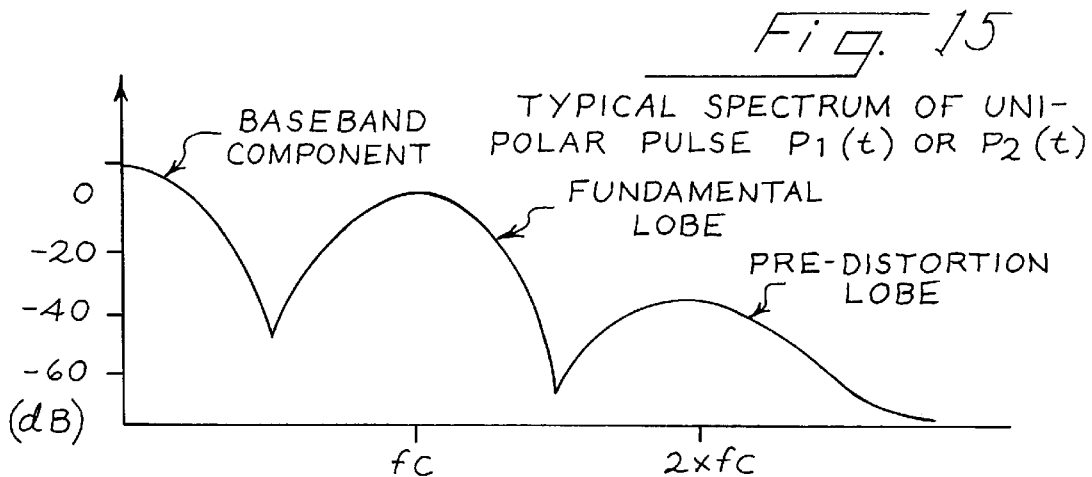

In this case, if low sidelobe envelope shapes are chosen for e(t) and x(t), the energy in the spectra of p1(t) and p2(t) around the second harmonic can be made very small. FIG. 14 illustrates the baseband spectrum of a Gaussian envelope, e(t). If x(t) is similarly a Gaussian shape, the spectra of p1(t) and p2(t) will be similar to that illustrated by FIG. 15.

Thus, for the continuous waveforms of this example, phase complementary unipolar pulses p1(t) and p2(t) are constructed which independently have controlled second harmonic distortion and when summed have very small spectral energy in the fundamental and second harmonic imaging bands. The waveforms also have the other desired properties of incorporating useful pre-distortion cancellation functions and a linearizing baseline offset function.

Next, the technique will be illustrated with respect to a discrete time and magnitude form which is appropriate in practical digitally controlled transmitter implementations.

To better understand the preferred quantized construction technique, it is useful to rewrite the expressions for p1(t) and p2(t) in the following form:

$$p1(t)=\underline{x}(t)+e(t)(1+\cos(2pi*f*t))+a1(t)*\cos(4pi*f*t+phi1(t)) \geq 0,$$

$$p2(t)=\underline{x}(t)+e(t)(1-\cos(2pi*f*t))+a2(t)*\cos(4pi*f*t+phi2(t)) \geq 0,$$

where a1(t) and a2(t) are the pre-distortion envelopes for p1 and p2, respectively. If no pre-distortion is required in an application, a1(t) and a2(t) can be set zero. The sum of p1 and p2 will be $2\underline{x}(t)+2e(t)=2x(t)$, as before.

The terms (1+/-cos (2pi*f*t)) are offset carriers which are unipolar.

The baseband offset signal $\underline{x}(t)$, modulation envelope e(t), offset carriers, and pre-distortion terms will be typically quantized into samples at an interval which is a fractional power of two of the fundamental period, T=1/f. (e.g. T/4 or T/8). The three components can be quantized at different powers of two and then summed to form a composite pulse train which is in turn represented with samples at the largest power of two, e.g. T/4 or T/8.

In order that the phase rotation information of the pre-distortion harmonic terms, phi1 and phi2, be represented arbitrarily and unambiguously, the sample period is preferably T/8 or smaller. If phi1 and phi2 are zero, good spectral properties can be obtained as in the example below with p1 and p2 sampled with a period of T/4 or larger.

Waveforms that are discrete in time and amplitude can be determined apriori for a given transmitter channel and then generated by the transmit pulse from waveform data read out of a small memory into a digital to analog converter. Transmitter and waveform generation techniques are similar to those described in U.S. patent application Ser. No. 08/893, 150, which is hereby incorporated by reference.

Figure 16:
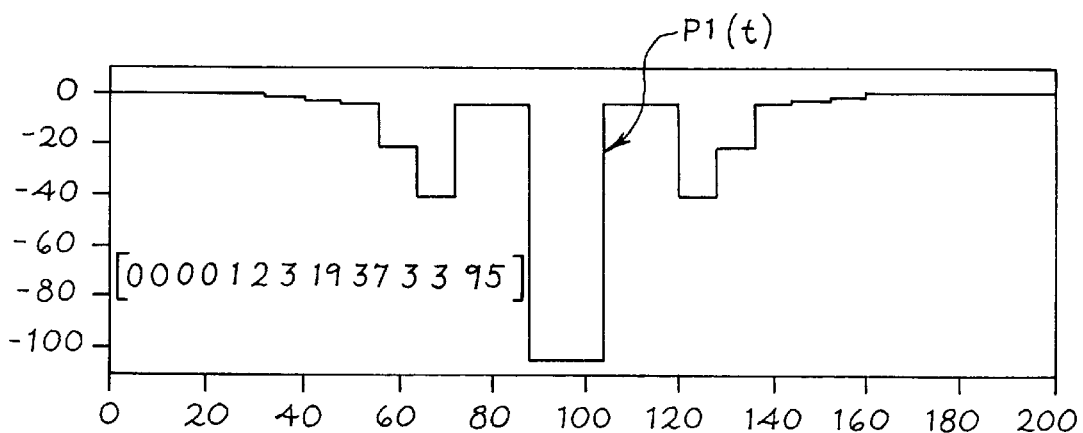
FIGS. 16 and 17 are a waveform diagram and a frequency spectrum, respectively, of a transmit pulse p1(t) of a first polarity.
Figure 17:
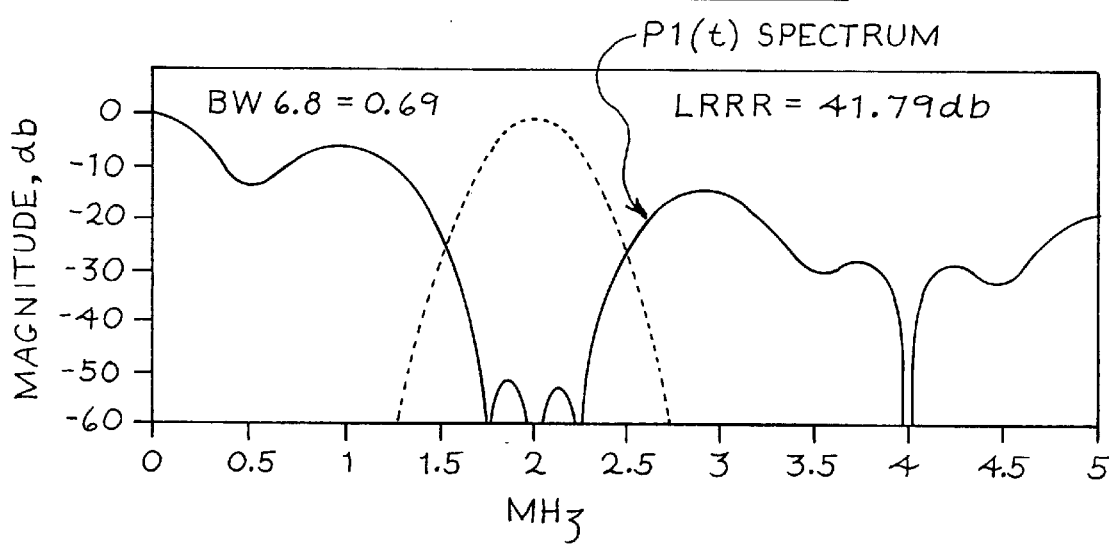
Figure 18:
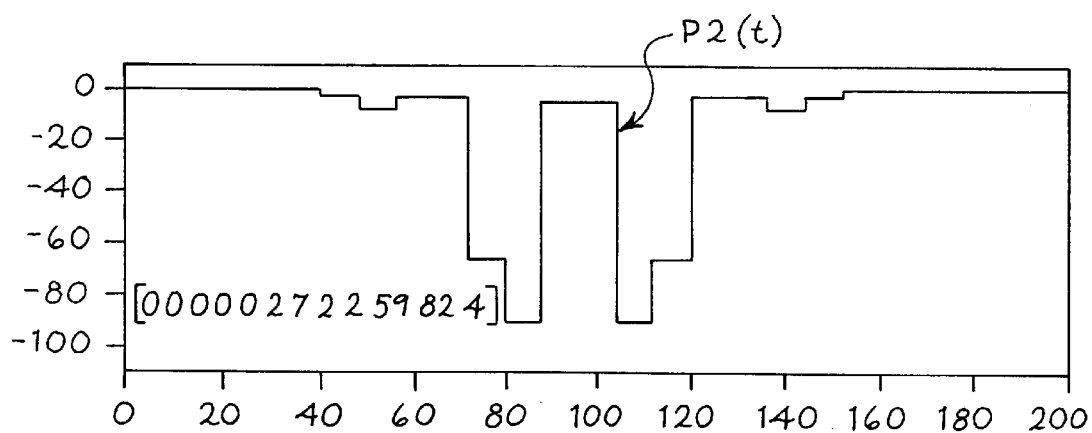
FIGS. 18 and 19 are a waveform diagram and a frequency spectrum, respectively, of a second transmit pulse p2(t) of a second polarity.
Figure 19:
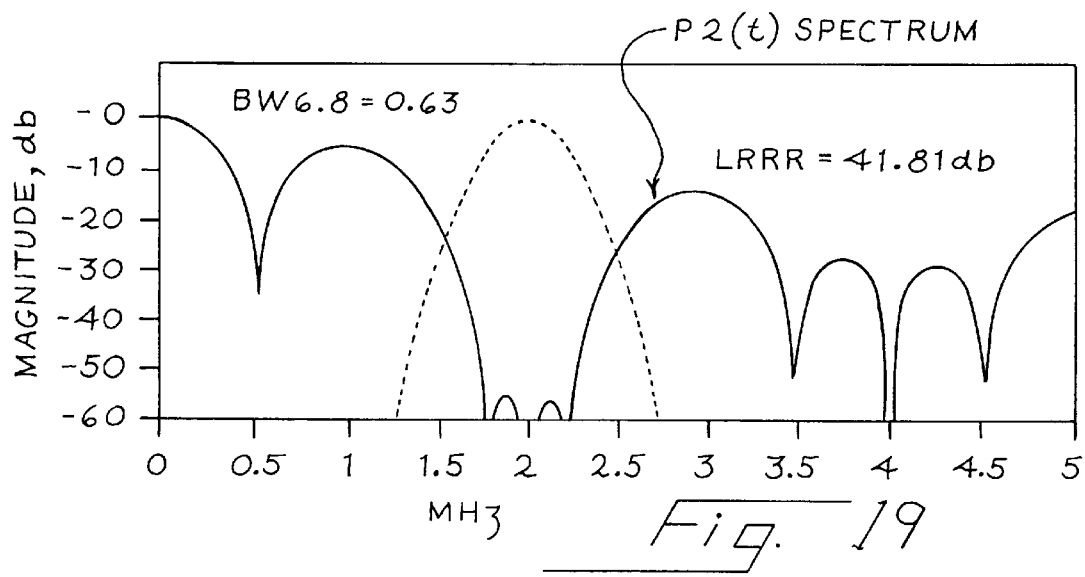

Exemplary discrete pulse waveforms for p1 and p2 are shown in FIGS. 16 and 18 along with their spectra in the frequency domain (FIGS. 17 and 19). These unipolar waveforms have complementary carrier phase and are quantized in amplitude to 96 levels (from 0 to 95 peak). The illustrated waveforms have a baseline offset function and are designed to have relatively wide fundamental mainlobe bandwidths and relatively low spectral energy in the second harmonic region. The pre-distortion terms are zero in these examples.

The waveforms of FIGS. 16 and 18 use a square wave offset carrier which is equivalent to T/2 sampling of the carrier component. An offset square wave carrier has slightly higher spectral energy at the fundamental than a more finely sampled offset carrier. The envelope function and baseline offset functions are discrete Guassian approximations which are sampled at T/4.

Figure 20:
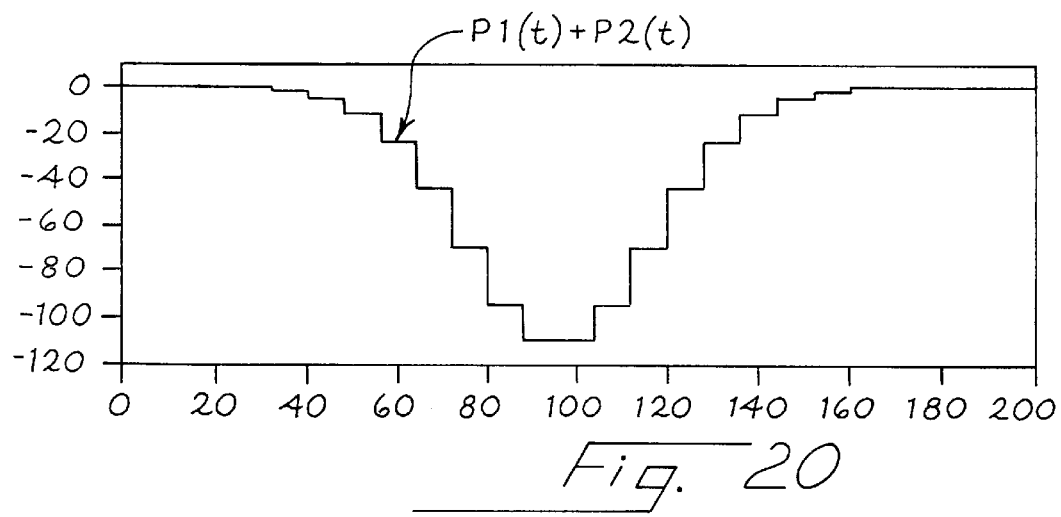
FIGS. 20 and 21 are a waveform diagram and a frequency spectrum, respectively, of a combined signal equal to the sum of p1(t) and p2(t).
Figure 21:
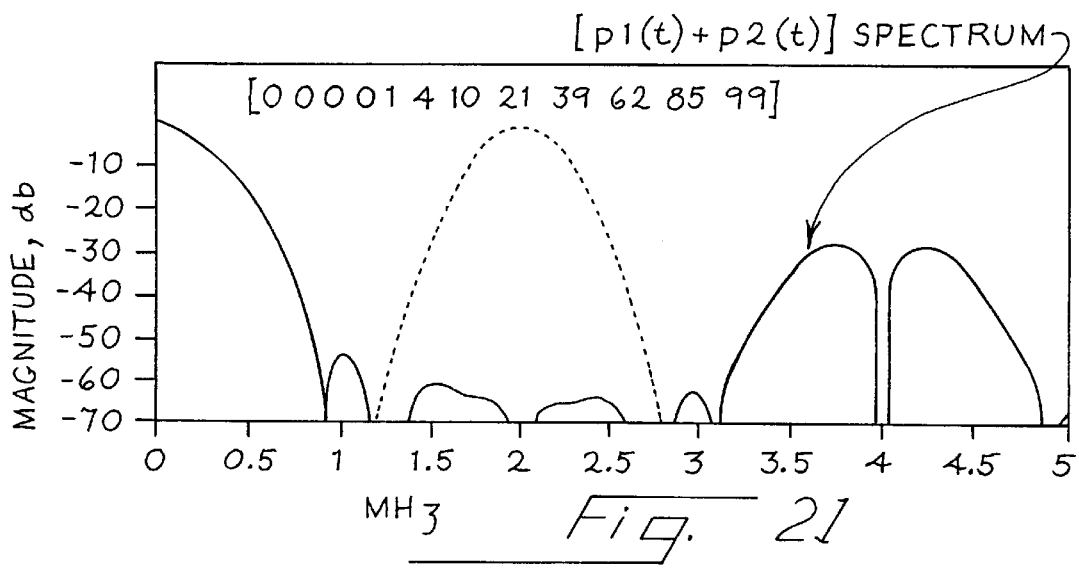

The sum of p1 and p2 and the corresponding spectrum are shown in FIGS. 20 and 21. Note that the sum is essentially a sampled Gaussian envelope with very low sidelobes in the region of the fundamental and the second harmonic. This is the desired characteristic for two-pulse harmonic imaging, since the linear echo terms cancel.

It should be noted from these examples that a proportionally larger baseband offset function results in a proportionally smaller peak-to-peak excursion of the modulated component of the signal, and thus less efficiency for given peak level. In a unipolar transmitter design which maximizes efficiency, it is desirable to choose the baseband offset component as small as possible while still providing adequate linearity in the transmitter to achieve distortion goals.

When pre-distortion waveforms are incorporated in the sampled pulse train, it is desirable to use a finer sampling interval of at least T/8 so that the phase components of the pre-distortion terms are adequately represented. Samples at T/8 provide 4 samples per period of the second harmonic carrier.

Unipolar transmitter waveform generation and output scaling techniques are basically the same as those described in above-identified U.S. patent application Ser. No. 08/893, 150, filed Jul. 15, 1997, which is incorporated by reference herein. For two-pulse imaging, the transmitter should be capable of alternating between the two waveform types, p1(t) and p2(t), on sequential line firings.

Figure 22:
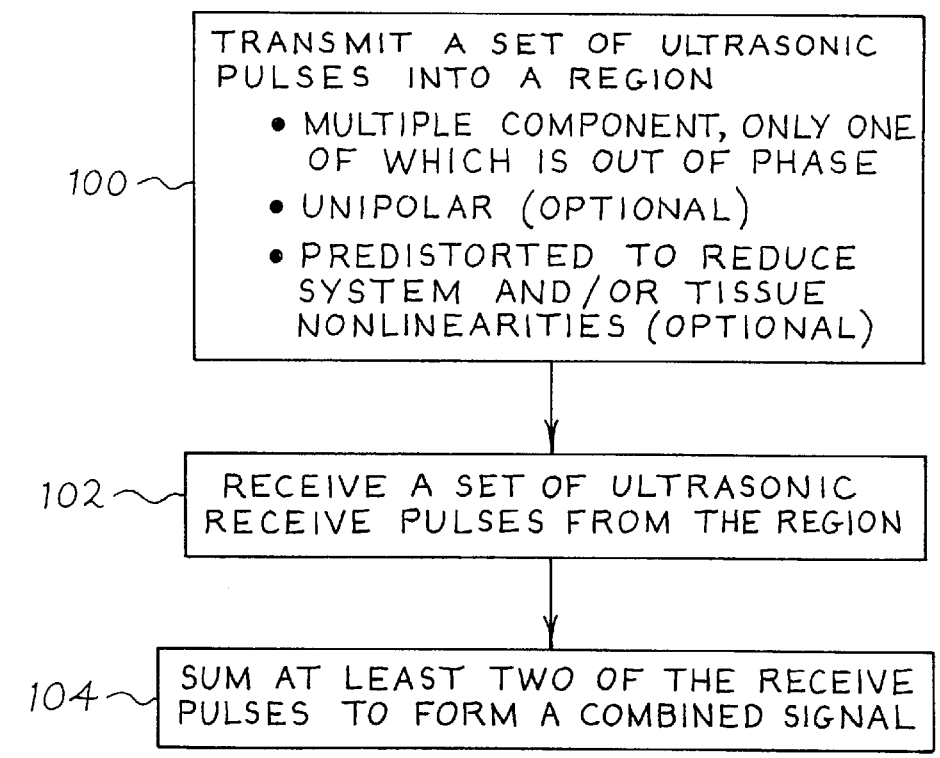
FIG. 22 is a flow chart of a method implemented with the imaging system of FIG. 1.

The ultrasonic imaging methods with multiple pulse cancellation described above can be summarized with the flow chart of FIG. 22. These methods include a first step 100 of transmitting a set of ultrasonic transmit pulses into a region. Consecutive ones of these transmit pulses are multiple component, one component of which is out of phase between the two transmit pulses to a greater extent than the other component. As explained above, these multi-component transmit pulses can be designed to be unipolar or to provide pre-distortion to reduce system and/or tissue nonlinearities.

In step 102 ultrasonic receive pulses are received from the region. In step 104 at least two of the receive pulses are summed with either like or opposite polarity to form a combined signal. Summing with like polarity causes the combined signal to emphasize harmonic components and to suppress fundamental components of the receive pulses. Conversely summing with opposite polarity results in a combined signal with enhanced fundamental components and suppressed harmonic components.

The two pulse imaging waveform techniques described above provide several advantages:

1. They allow sequential unipolar pulses of complementary phase to be fired such that the corresponding echoes when added will suppress the undesired fundamental echo component and the undesired echo component due to the transmitted second harmonic, and will enhance the desired second harmonic echo component generated by non-linear propagation or non-linear scattering.

2. They allow transmit pulses to be pre-distorted in order to cancel other non-linearities in the acoustic transmit signal generation path or non-linear components generated by pulse propagation to a target.

3. They allow a transmitter pulse bias signal (offset signal) to be applied for linearizing the transmitter driver in high efficiency on/off transmitters.

Many alternatives to the preferred embodiments described above are possible. For example, the two transmit pulses that contribute to the summed receive pulses may be either spatially aligned as taught by the above identified Hwang and Chapman patents or spatially distinct as described in co-pending U.S. patent applications Ser. Nos. 08/993,533 and 08/993,395, which are hereby incorporated by reference.

The summing operations described above can include summing more than two ultrasound signals, and the summing may be either of like polarity to selectively suppress fundamental components or opposite polarity to selectively suppress second harmonic components. If desired, a weighted sum can be used.

As used herein, the term "set" is intended broadly to encompass two or more pulses.

As used herein, two components are said to be substantially in phase whenever their sum is greater than the larger of the two. Thus, two components can be substantially in phase even if they are not matched in phase.

The embodiments described above can be used with or without added contrast agent in both contrast and tissue harmonic imaging.

The foregoing detailed description has described only a few of the many forms that this invention can take. For this reason this description is intended by way of illustration and not by way of limitation. It is only the following claims, including all equivalents, that are intended to define the scope of this invention.

We claim:

1. An ultrasonic imaging method comprising the following steps:
   (a) transmitting a set of ultrasonic transmit pulses into a region, each transmit pulse comprising respective first and second transmit components, the first transmit components associated with selected ones of the transmit pulses modulated at a fundamental ultrasonic frequency and being out of phase by a phase difference, the second transmit components associated with said selected ones of the transmit pulses being substantially in phase;
   (b) receiving a plurality of ultrasonic receive pulses from the region, each receive pulse associated with a respective one of the transmit pulses, and each receive pulse comprising a respective fundamental receive component and a respective harmonic receive component; and
   (c) combining at least two of the receive pulses to form a composite signal, said phase difference effective to cause the fundamental receive components to destructively interfere to a different extent than the harmonic receive components in the summing step.

2. The method of claim 1 wherein the second transmit components comprise harmonic transmit components characterized by a phase and amplitude relative to the respective first transmit components selected to reduce at least one of system harmonic energy and tissue harmonic energy in the composite signal.

3. An ultrasonic imaging method comprising the following steps:
   (a) transmitting a set of unipolar ultrasonic transmit pulses into a region, said transmit pulses each comprising a respective fundamental transmit component, the fundamental transmit components associated with selected ones of the transmit pulses characterized by a phase difference;

(b) receiving a plurality of ultrasonic receive pulses from the region, each receive pulse associated with a respective one of the transmit pulses, and each receive pulse comprising a respective fundamental receive component and a respective harmonic receive component; and (c) combining at least two of the receive pulses to form a composite signal, said phase difference effective to cause the fundamental receive components to destructively interfere to a different extent than the harmonic receive components in the summing step.

4. An ultrasonic imaging method comprising the following steps:

(a) transmitting a set of ultrasonic transmit pulses into a region, each transmit pulse comprising respective first and second transmit components, the first transmit component modulated at a fundamental ultrasonic frequency, the first transmit components associated with selected ones of the transmit pulses characterized by a phase difference different than the respective second transmit components;

(b) receiving a plurality of ultrasonic receive pulses from the region, each receive pulse associated with a respective one of the transmit pulses, and each receive pulse comprising a respective fundamental receive component and a respective harmonic receive component; and (c) combining at least two of the receive pulses to form a composite signal, said phase difference effective to cause the fundamental receive components to destructively interfere to a different extent than the harmonic receive components in the summing step.

5. The method of claim 1 or 4 wherein the second transmit components comprise components modulated at a harmonic of the fundamental frequency.

6. The method of claim 1 or 4 wherein the first and second transmit components are modulated with envelopes having low spectral sidelobes in a frequency region around a second harmonic of the fundamental frequency.

7. The method of claim 1 or 4 wherein the second transmit components comprise baseband components.

8. The method of claim 1 or 4 wherein the transmit pulses are quantized in time and amplitude.

9. The method of claim 8 wherein at least some of the transmit pulses comprise components modulated at a second harmonic of the fundamental frequency.

10. The method of claim 9 wherein the transmit pulses are characterized by a sampling interval no greater than T/8, where T is the period of the fundamental first transmit components.

* * * * *

UNITED STATES PATENT AND TRADEMARK OFFICE
CERTIFICATE OF CORRECTION

PATENT NO. : 5,902,243
DATED : May 11, 1999
INVENTOR(S) : Gregory L. Holley et al.

It is certified that error appears in the above-indentified patent and that said Letters Patent is hereby corrected as shown below:

In column 5, line 18, change "$p2(t) = x(t) + y2(t),$" to --$p2(t) = x(t) - y2(t),$--.

Signed and Sealed this

Twenty-ninth Day of February, 2000

Attest:

Q. TODD DICKINSON

*Attesting Officer*  *Commissioner of Patents and Trademarks*